Figure 1:

Dec. 12, 1933.  H. FRANK  1,938,692
RETURN BEND MANUFACTURE
Filed Jan. 28, 1930   2 Sheets-Sheet 1

INVENTOR
Herbert Frank
BY
ATTORNEY

Dec. 12, 1933.     H. FRANK     1,938,692
RETURN BEND MANUFACTURE
Filed Jan. 28, 1930     2 Sheets-Sheet 2

INVENTOR
Herbert Frank
BY
ATTORNEY

Patented Dec. 12, 1933

1,938,692

UNITED STATES PATENT OFFICE 1,938,692

RETURN BEND MANUFACTURE

Herbert Frank, Cassel-Wilhelmshohe, Germany, assignor to The Superheater Company, New York, N. Y.

Application January 28, 1930, Serial No. 423,948, and in Germany February 9, 1929

11 Claims. (Cl. 29—157.6)

This invention relates to a process for the manufacture of tubing with U-shaped return bends and to certain intermediate products useful in such a process. Elements containing such return bends are used, for example, in superheaters for steam. Where the return bends must be made on a small radius, for example, on one smaller than the diameter of the pipe such as is often required for elements of this kind, the difficulty arises that the pipe becomes flattened at the point where it is bent. The free interior area of the pipe is thus restricted at this point where it would be especially desirable to have a somewhat larger free area in order to avoid great pressure drop in the medium flowing through the pipe. This drawback of the methods of manufacturing these structures as practiced heretofore is avoided according to the present invention by giving to the pipe a greater inside diameter at the point where it is to be bent. When subsequently during the bending this enlarged portion of the pipe which, in the final product forms the return bend, becomes somewhat flattened, yet by choosing the amount of enlargement properly, the final free area at the return bend can be equal to the area in the straight lengths, or, if desired, somewhat greater. At the same time there is the additional advantage that the outer portion of the wall of the U-shaped return bend is stretched by a smaller amount than would be the case if the enlargement of the pipe had not been made. The advantages of the new process will be felt particularly if the swelled enlargement is made not concentric with the axis of the pipe but is offset laterally toward the side on which the return bend is to lie. In order to compensate for the elongation of the wall of the pipe during bending or to obtain return bends with a thickened outer wall, pipes may be used which have a wall thickened on one side in a known manner, or pipes of novel conformation may be used as hereinafter appears.

The swelled enlargement on the pipe can be obtained in one of several ways. A particularly advantageous method of obtaining it consists, according to the present invention, in beginning with a pipe that in the first place has the same inner cross-sectional area throughout its length and is then swaged in each direction toward a short central piece to a diameter desired for the straight lengths of the final structure. If a pipe with its wall thickened at one side is used, then a uniform thickness can be given to the straight lengths during this swaging down, while the unswaged central piece can retain the original thickening so that it appears at the outside of the return bend.

A further variation of the invention relates to the manufacture of coils with several lengths arranged in a zig-zag formation in which the return bends show a greater wall thickness on the outer side. In order to manufacture such zig-zag coils, the invention contemplates first providing a novel form of pipe also of non-uniform wall thickness. This initial pipe form is peculiar inasmuch as the thickened portions do not lie parallel to the pipe axis but lie in a helical line around the pipe.

This pipe with the helically arranged thickening of its wall is then swaged down to the diameter desired for the final pipe coil over such portions that at regularly spaced intervals a short swelling or enlargement remains. These enlargements must again lie not coaxially with the pipe but must be offset, that is, they must be hollow and extend toward the side of the greatest wall thickness. The lengths of the pipe portions which are swaged down to the desired diameter of the final coil correspond to the straight lengths of the coil between return bends. By properly selecting the pitch of the helix on which the thickening of the wall is arranged at the outset, the fixed portion of the swellings will alternately lie on opposite sides. In order to make the serpentine coil from the pipe formed according to the invention with such enlargements, the pipe is then bent at the swelled points through 180° in such a manner that the thickened portion of the swelling will in each case lie on the outside.

Figure 2:
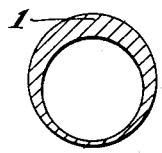
Figure 3:
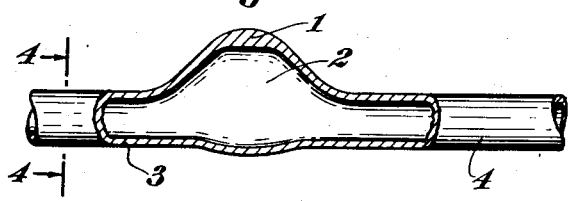
Figure 4:
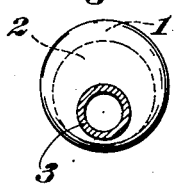
Figure 5:
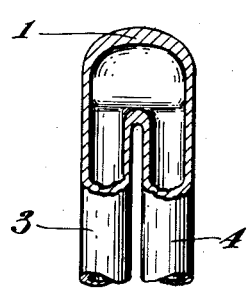
Figure 6:
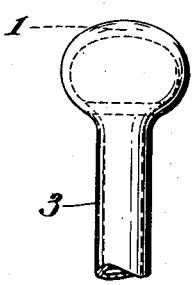
Figure 7:
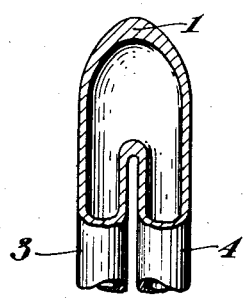
Figure 8:
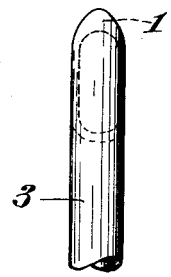
Figure 9:
Figure 11:
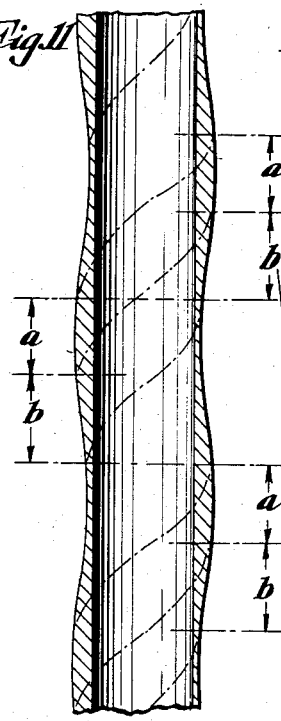
Figure 13:
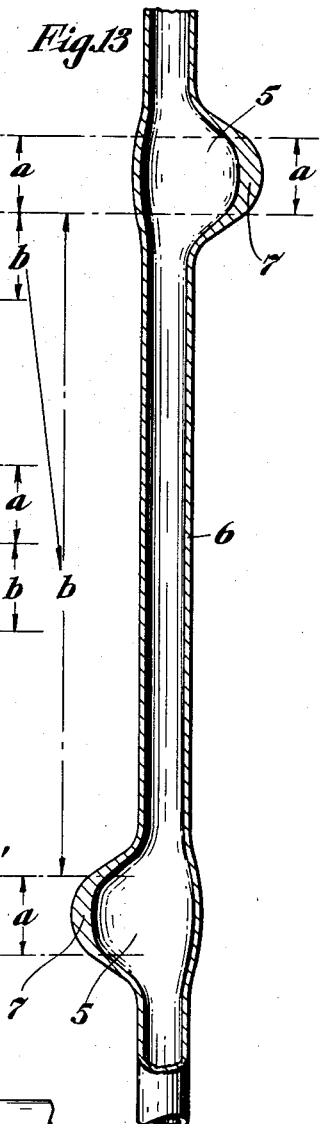
Figure 10:
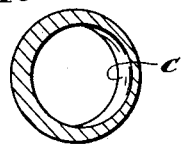
Figure 12:
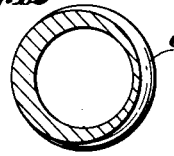
Figure 14:
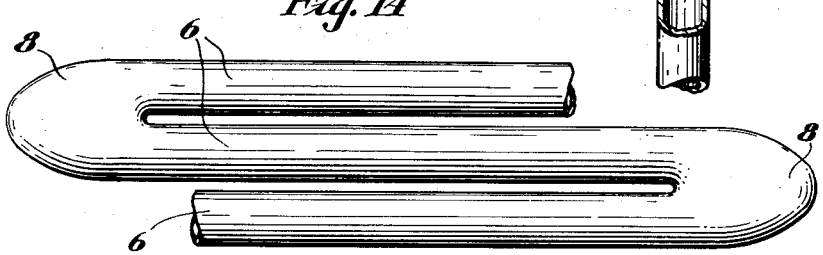

The new process will next be explained in greater detail with reference to the accompanying drawings. In these, Fig. 1 shows a longitudinal section of a pipe with a unilaterally thickened wall and with a uniform inner cross-sectional area. Fig. 2 shows a cross-section of such a pipe. Fig. 3 illustrates the pipe after it has been swaged down to the smaller diameter leaving the swelling or enlargement; Fig. 4 is a cross-section on line 4—4 of Fig. 3; Fig. 5 shows the U-bend in longitudinal section which has been made by bending the pipe through 180°, and Fig. 6 shows a view at right angles to Fig. 5; Figs. 7 and 8 show, respectively, views corresponding to 5 and 6 of the finished return bend. In Figs. 9 and 10 is shown in longitudinal and transverse section, respectively, a pipe with a spirally arranged thickened portion of the wall; Figs. 11 and 12 show views corresponding to Figs. 9 and 10 of a varied form of such thickening; Fig. 13 shows the pipe as it looks after certain lengths of it have been swaged down, the enlargements being shown between the swaged down portions; Fig. 14 shows a zig-zag coil formed from such an intermediate form as shown in Fig. 13.

The pipe illustrated in Figs. 1 and 2 has a bore which lies eccentric with relation to the outside surface. The wall thickness is therefore not uniform transversely of the tube, being thickest at 1 on the upper side and the thickened portion extending parallel to the tube axis. The inner free area of the tube is uniform throughout the length of the pipe. Such pipes are well known and can be made by drilling a solid bar of metal. If such a pipe is swaged down all along its length except for a short central portion, there is obtained a definitely longer pipe of smaller diameter with an enlargement indicated at 2 in Figs. 3 and 4 which has a portion of its wall of the same thickness as the original pipe at 1. The swaging of the pipe is performed in such a manner that the portion which remains of the larger size is not in line with the two lateral portions 3 and 4 of smaller diameter but is in the form of a boss which extends laterally from the axis toward the side on which the thicker wall is located. If, now, the two reduced sections of the pipe are bent away from the thicker wall portion through 180° at the enlarged place, the enlarged portion forms the U-shaped return bend having the thicker portion 1 of its wall on the outside. During this bending, a certain elongation of the outer pipe wall and a consequent flattening of the pipe over this area occurs. Since, however, the cross-sectional area of the pipe at the bending place is considerably enlarged, the free area at the point of bending is of ample dimensions after such bending. In the form illustrated in the drawings, the free area is larger than in the straight portions 3 and 4. A further advantage of placing the enlargement 2 toward one side of the pipe resides in the fact that the stretching of the thicker portion 1 of the outer wall during bending is kept down to a minimum. Consequently the relative thickening of the pipe wall in the unfinished stage as illustrated in Fig. 3 does not need to be very much more than is required in the final return bend. From the approximately spherical return bend as it appears in Figs. 5 and 6, the usual form of the return bend as shown in Figs. 7 and 8 and as used for example in connection with superheater elements is attained by means of flattening in an appropriate die. The process just described, which starts with a seamless pipe in which the thickening of the pipe wall lies parallel to the axis of the pipe, will be used particularly when simple U-shaped structures are to be manufactured. When it is desired to make zig-zag structures, that is, pipe structures having several straight lengths connected alternately at their ends with return bends, it will be found advantageous to start with a seamless tube in which the thickening of the wall follows a spiral path around the pipe. Such tubes, I have found, may be made in the well known Pilger mill.

The pipe shown in Figs. 9 and 10 is smooth on the outside, the spiral reinforcement of the wall lying on the inside of the pipe as indicated at C, Fig. 10. In the pipe according to Figs. 11 and 12 on the other hand, the bore of the tube is smooth while the thickening is arranged on the outside as indicated at C', Fig. 12. The forms illustrated in Figs. 9–12 have walls tapering gradually in thickness from points of maximum to points of minimum thickness along lines parallel to the tube axis. These tubes are then drawn down or swaged down over separated portions as, for example, in both directions from the portions $a$ in Fig. 11. The portions $a$ are not drawn down and thus remain as the enlargements 5, while the portions $b$ extending between the portions $a$ are appreciably lengthened by being drawn down to the smaller diameter desired in the final structure, such portion $b$ forming the straight length 6 between the two enlargements 5. By properly selecting the relative diameter and wall thickness of the initial large tube and the amount by which the straight lengths of smaller diameter are swaged or drawn down, the desired length of the straight portions of the final structure can be obtained. If, moreover, the pitch of the spiral along which the thickening of the wall in the original piece occurs is selected so that in the form of the initial pipe according to Fig. 11 the thickest portions of the swellings in a central longitudinal section of the pipe lie alternately on opposite sides of the axis of the section from each other, then the proper location of the swellings in the swaged-down pipe will follow. As will be clear from Fig. 13, the swelled portions with the thickened wall 7 extend alternately from opposite sides of the axis of the pipe. At the swelled areas the pipe is bent through 180° in such a manner that the thickened walls 7 will lie on the outside of the resulting return bends. By flattening the bent portions, a zig-zag structure, as shown in Fig. 14 is obtained which has straight legs 6 and reinforced return bends 8 of amply large cross-sectional area and which is entirely free of welded joints. If after the spaced swaging down of the pipe the swellings do not have the desired location for the bending that has to be done next, they can be brought into the desired position by a proper amount of axial twist of the straight tube portions.

In the example illustrated in the drawings, one-half of the pitch of the spiral along which the wall thickening extends is a measure of the length of the straight portions of the final product diminished by the factor of stretching resulting from the swaging down of the pipe to a smaller diameter. The pitch of the spiral can also be so chosen that $n + \frac{1}{2}$ of the pitch of the spiral corresponds to the distance just mentioned. Such a form may be used when the straight lengths are relatively very large.

An advantage possessed by both the structure shown in Fig. 7 and that shown in Fig. 14 is that there are no welded joints, the structures being entirely seamless.

I claim:

1. A seamless tube having longitudinally spaced hollow swellings thereon, the wall of the tube being relatively thicker at said swellings, each of said swellings projecting substantially entirely on one side only of the tube axis.

2. A straight seamless tube portion having longitudinally spaced hollow swellings projecting in opposite directions from the tube axis, each of said swellings lying substantially on one side only of the tube axis.

3. A seamless tube having longitudinally spaced hollow swellings projecting in opposite directions from the axis of the tube, each of said swellings lying substantially on one side only of the tube axis and the wall of the tube having relatively thicker portions at said swellings.

4. A seamless tube having longitudinally spaced enlarged hollow bosses extending in opposite directions from the tube axis, each of said bosses lying substantially on one side only of the tube axis and having their walls relatively thicker over the portions farthest from the tube axis.

5. A tube provided with walls having a helically arranged relatively thicker portion, said walls tapering gradually from points of maximum to points of minimum thickness along lines parallel to the tube axis.

6. The process of making return bends comprising so reducing the external and internal diameter of spaced portions of a tube having its wall thicker at some places than at others as to form aligned tube runs having walls of uniform thickness and to leave a portion having a relatively large free internal cross sectional area connecting said runs and having a relatively thick wall on one side with its inner face at a relatively great distance from the central axis of said alined runs, and bending the tube at said enlarged portion so as to form a bend having said thickened wall portion on the outside of the curve of the bend.

7. A process as set forth in claim 6 and in which the tube is flattened at the bend after the steps enumerated in claim 6.

8. The process of making coils comprising reducing the diameter of portions of a tube having a relatively thick portion arranged helically in its wall to form aligned tube runs having walls of uniform thickness connected by a plurality of portions having relatively large free internal cross sectional areas projecting in opposite directions from the tube axis and having relatively thick walls over portions farthest from the tube axis, and bending the tube at said enlarged portions to form a pipe coil in which straight runs are connected by return bends having thickened wall portions on the outsides of the curves of the bends.

9. A method of making serpentive coils comprising bending a seamless tube having longitudinally spaced hollow bosses having relatively large free internal cross sectional areas and thickened wall portions lying in the same axial plane on opposite sides of the tube axis to bring said thickened wall portions on the outsides of the curves of the bends.

10. The process of making return bends, comprising so reducing the diameter of spaced portions of a tube having its wall thicker at some places than at others as to form alined tube runs having walls of uniform thickness, and to leave portions having relatively large free internal cross sectional areas connecting said runs and having each an imperforate wall of relatively greater thickness on one side than on the other, and bending the tube at each of said enlarged portions so as to form a bend having said relatively thick wall portion on the outside of the curve of the bend.

11. The method of making serpentine coils comprising forming a tube so that its walls have a helically arranged relatively thick portion, said walls tapering gradually from points of maximum to points of minimum thickness along lines parallel to the tube axis, reducing the diameter of portions of said tube to form aligned tube runs having walls of uniform thickness connected by a plurality of portions each having a relatively large free internal cross sectional area and each lying substantially on one side only of the tube axis but adjacent enlarged portions projecting in opposite directions from the tube axis, said projecting portions having relatively thick walls over portions farthest from the tube axis, and bending the tube at said enlarged portions to form a pipe coil in which straight runs are connected by return bends having thickened wall portions on the outside of the curves of the bends.

HERBERT FRANK.